United States Patent [19]

Saegusa et al.

[11] 4,182,846
[45] Jan. 8, 1980

[54] FLUORINE-CONTAINING COPOLYMERS, AND THEIR PRODUCTION AND USE

[75] Inventors: Takeo Saegusa, Kyoto; Akira Yamada, Osaka; Masaaki Iwase, Takarazuka; Akitoshi Iwatani, Suita, all of Japan

[73] Assignee: Daikin Kogyo Co., Ltd., Osaka, Japan

[21] Appl. No.: 905,057

[22] Filed: May 11, 1978

[30] Foreign Application Priority Data

May 12, 1977 [JP] Japan .................................. 52-55075

[51] Int. Cl.$^2$ .............................................. C08G 69/44
[52] U.S. Cl. ...................................... 528/341; 252/8.8
[58] Field of Search .......................................... 528/341

[56] References Cited
U.S. PATENT DOCUMENTS

| 3,275,608 | 9/1966 | Montgomery et al. ............. 260/78.4 |
| 3,637,594 | 1/1972 | Gallus et al. ..................... 260/47 CP |
| 3,876,617 | 4/1974 | Caporiccio et al. ............. 260/47 CP |

Primary Examiner—Earl A. Nielsen
Attorney, Agent, or Firm—Stevens, Davis, Miller & Mosher

[57] ABSTRACT

A fluorine-containing copolymer which comprises essentially as the constituting units (a) a group of the formula:

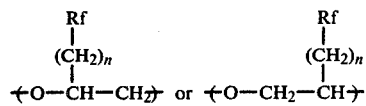

wherein Rf is a perfluoroalkyl group having 3 to 21 carbon atoms and n is an integer of 0 or 1, (b) a group of the formula:

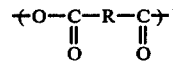

wherein R is a residue obtained by eliminating a group:

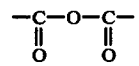

from a cyclic acid anhydride and (c) a group of the formula:

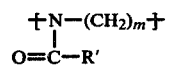

wherein R' is a hydrogen atom, an alkyl group or an aryl group and m is an integer of 2 or 3, and is useful as a water and oil-repelling agent or a non-sticking agent.

18 Claims, No Drawings

FLUORINE-CONTAINING COPOLYMERS, AND THEIR PRODUCTION AND USE

The present invention relates to novel fluorine-containing copolymers. More particularly, it relates to fluorine-containing copolymers having a perfluoroalkyl group as a side chain, and their production and use.

The fluorine-containing copolymer of the invention comprises essentially as the constituting units (a) a group represented by the formula:

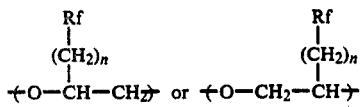

wherein Rf is a perfluoroalkyl group having 3 to 21 carbon atoms and n is an integer of 0 or 1, (b) a group represented by the formula:

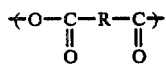

wherein R is a residue obtained by eliminating a group:

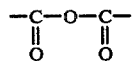

from a cyclic acid anhydride and (c) a group represented by the formula:

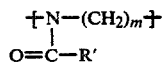

wherein R' is a hydrogen atom, a lower alkyl group or a phenyl group and m is an integer of 2 or 3.

As the examples of the symbol R, there are included the following three divalent groups:

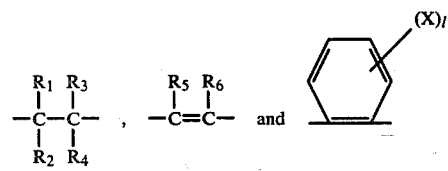

wherein $R_1$ to $R_6$ is a hydrogen atom or a lower alkyl group, $R_1$ and $R_3$ being optionally combined together to form a cyclic ring, particularly a 5 to 7-membered carbocyclic ring (including the two carbon atoms to which $R_1$ and $R_3$ are attached), X is a halogen atom or a lower alkyl group and l is an integer of 0 to 4.

In the said copolymers, the molar proportion of the groups (a), (b) and (c) may be 1:1–3:1, preferably almost 1:1:1.

Further, in the copolymer, a portion of the units (a) may be replaced by the unit of (d) a substituted oxyethylene group represented by the formula:

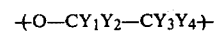

wherein $Y_1$ to $Y_4$ are each a hydrogen atom, a phenyl group or a lower alkyl group optionally substituted with a halogen atom, a lower alkoxy group or a phenoxy group. In this case, the proportion of the units of the group (d) to the units of the groups (a) and (d) is preferred to be not more than 95 mol %.

The term "lower" as herein used in connection with alkyl or alkoxy is intended to mean a group having not more than 5 carbon atoms.

The copolymer of the invention has as a side chain a perfluoroalkyl group originating from the group (a) and is useful as a coating film forming material on surfaces of various substrates. The coating film prepared from the copolymer possesses a low surface activity due to the perfluoroalkyl side chain and shows, at the same time, an excellent adhesion to a substrate owing to the presence of functional groups in the main and side chains. Thus, the copolymer is advantageously utilizable as an oil and water-repelling agent and also as a non-sticking agent.

The copolymer of the invention may be prepared by treating under polymerization conditions (a') an epoxide represented by the formula:

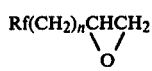

wherein Rf and n are each as defined above, (b') a cyclic acid anhydride represented by the formula:

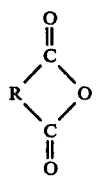

wherein R is as defined above and (c') a cyclic imino ether represented by the formula:

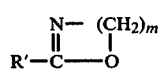

wherein R' and m are each as defined above. A portion of the epoxide (a') may be replaced by (d') a substituted epoxide represented by the formula:

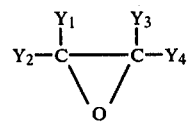

wherein $Y_1$ to $Y_4$ are each as defined above.

The epoxide (a') is generally known. For example, 2-perfluoroalkyl-1,2-epoxyethane (a': n=0) is described in German Offenlegungsschrift No. 2,160,783. Further, 3-perfluoroalkyl-1,2-epoxypropane (a': N=1) can be prepared by the reaction of 3-perfluoroalkyl-2-iodopropanol-1 with an alkali hydroxide according to the method described in Japanese Patent Publication No. 26286/1969. The perfluoroalkyl group contained in the epoxide (a') has 3 to 21 carbon atoms, preferably 5 to 16 carbon atoms. The epoxide (a') may be a single kind. A mixture of two or more kinds of epoxides (a') may be also employed as the starting material.

The cyclic acid anhydride (b') is a five membered cyclic compound obtained by dehydration from two carboxyl groups respectively linked to two carbon atoms being adjacent each other and linked each other by a single bond or a double bond. Specific examples of such cyclic acid anhydride are succinic anhydride, phthalic anhydride, pyromellitic anhydride, 1,2-cyclohexanedicarboxylic anhydride, tetrahydrophthalic anhydride, 1,2,3,4-cyclopentanetetracarboxylic dianhydride, 1,2-cyclobutanedicarboxylic anhydride, 1,2-naphthalenedicarboxylic anhydride, 2,3-naphthalenedicarboxylic anhydride and their substituted derivatives. Thus, the cyclic acid anhydride (b') may be any one of the following compounds:

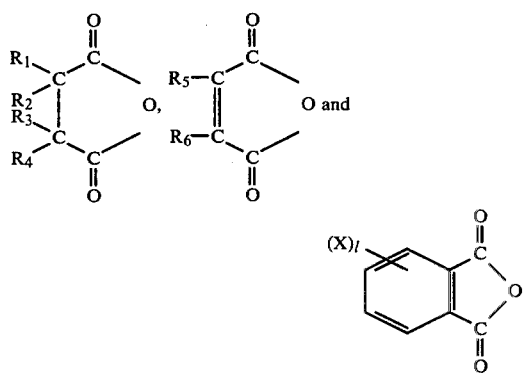

wherein $R_1$ to $R_6$, X and l are each as defined above. These may be used alone or in combination.

Examples of the cyclic imino ether (c') are 2-oxazoline, 5,6-dihydro-4H-1,3-oxazine and their substituted derivatives.

As the epoxy compound (d'), there may be exemplified ethylene oxide, propylene oxide, isobutylene oxide, butadiene oxide, styrene oxide, epihalogenohydrin (e.g. epichlorohydrin), alkyl or aryl glycidyl ether (e.g. methylglycidyl ether, phenylglycidyl ether), etc.

The molar proportion of the monomers (a'), (b') and (c') is usually 1:1–3:1, preferably almost 1:1:1. When the epoxy compound (d') is used, its amount may be not more than 95 mol % based on the combination of the epoxide (a') and the epoxy compound (d').

The polymerization can proceed by mixation of the monomers (a'), (b') and (c') or (a'), (b'), (c') and (d') without any catalyst. The reaction mechanism is not yet clarified sufficiently. Supposedly, the cyclic imino ether (c') participates in the initiation of the polymerization reaction. Namely, it is thought that active ion species are firstly produced from the cyclic imino ether (c') and the cyclic acid anhydride (b') to initiate the polymerization reaction, and then the active ion species attack the cyclic compounds (a'), (b') and (c') or (a'), (b'), (c') and (d') successively to progress ionic polymerization reaction. The linking of the constituting units (a') to (c') or (a') to (d') is probably attained in a random order, and there is finally formed a copolymer constituted with the units (a), (b) and (c) or (a), (b), (c) and (d) produced by ring cleavage of the starting monomers (a'), (b') and (c') or (a'), (b'), (c') and (d'), respectively.

It has hitherto been known that a copolymerization reaction under ring cleavage takes place between a cyclic acid anhydride and an epoxide in the presence of a catalyst or between a cyclic acid anhydride or a cyclic imino ether in the absence of a catalyst to afford a copolymer having a constitution as mentioned above. But, copolymerization between a cyclic imino ether and an epoxide is unknown. In fact, it was confirmed that the epoxide (a') was not copolymerized with the cyclic imino ether (c').

It has now been unexpectedly found that, when anhydride is present together with an epoxide and a cyclic imino ether, a copolymerization reaction with ring cleavage can take place readily without any catalyst. It has also been found that those three monomers show an almost equal reactivity to afford a copolymer in which their units are present in a proportion approximately equal to that of the used starting monomers. The constitution of the copolymer comprising the said constituting units can be confirmed by knowing the presence of $>C=O$ in the ester group, $>C=O$ in the acid amide group, C—F bond based on the perfluoroalkyl group, etc. by various instrumental analysis. The present invention is based on the above findings.

It is known that a cyclic imino ether and an epoxide are treated to form a bicyclic amide acetal, which is isolated and then treated with a cyclic acid anhydride to obtain a polymer having no perfluoroalkyl group but comprising repeating units originated from the cyclic imino ether, the epoxide and the cyclic acid anhydride (Angew. Chem., 79, (4) 189 (1967)). However, there has never been known any method in which those three monomers are used at the same time to cause copolymerization with ring cleavage in the absence of any catalyst.

The process of the invention may be carried out by admixing the starting monomeric materials at a temperature from room temperature to about 200° C. without using any catalyst. The reaction solvent is not necessarily required, but the use of a polar solvent such as N,N-dimethylformamide or acetonitrile may sometimes make the operation convenient. The ratio of the amounts of the starting monomers need not be taken in consideration so greatly in regard to the reaction rate. In general, an equimolar ratio is adopted as the standard. With an excess amount of the cyclic acid anhydride (c'), the yield of the copolymer tends to increase and the copolymerizability of the epoxide (a') is apt to be enhanced. The ratio of the amounts of these monomers should be decided depending, rather than on the reactivity, on the proportion of the constituting unit (a) derived from the epoxide (a') and which is required for the properties of the copolymer to be prepared, particularly, the oil and water-repelling property and the non-sticking property as the characteristic properties of the copolymer.

In general, the copolymer of the invention is a thermoplastic substance with transparent appearance in which the said constituting units are contained principally in the main chain. It is soluble in acetone, ethyl acetate, chloroform, trifluorotrichloroethane or the like, but insoluble in water, ethanol, methanol, hexane, toluene or the like. The solvent-solubility is not influenced so greatly by the ratio of copolymerization of the monomers when the kinds of the monomers are not changed. But, it is varied in a relatively large range depending on the number of carbon atoms in the perfluoroalkyl group. With increase of the number of carbon atoms, the solubility is lowered. The copolymer of the invention in the form of solution or dispersion can be applied to a solid substrate so as to give to its surface an oil and water-repelling property and a non-sticking property. From this solution or dispersion, a self-supporting cast film can be prepared. The softening point of the copolymer is varied depending on the kinds of the monomers to be used. In many cases, it is in a relatively low temperature range of about 40° to 50° C.

The copolymer of the invention is utilizable as such or in the form of organic solvent solution or aqueous emulsion for various uses. It is particularly useful as an oil and water-repelling agent and a non-sticking agent because of the presence of a perfluoroalkyl group having a low surface energy as the side chain.

An oil and water-repelling agent is a substance which gives a property of repelling aqueous and oily substances to the surface of a solid substrate by due to decrease in the critical surface tension of said surface. The aqueous substances include water and aqueous solutions of water soluble materials such as alcohols. The oily substances include mineral, animal and vegetable oils and fats such as lamp oil, heavy oil, gasoline, liquid paraffin, pitch, asphalt, cotton oil, rape oil and whale oil. When applied to textile fabrics, for example, such oil and water-repelling agent exhibits an action of protection of the textile fabrics from contamination with aqueous stains such as inks and saurce and oily stains such as plant oils and mineral oils by repelling these contaminating materials. Further, for example, a paper or cloth treated with this oil and water-repelling agent is utilizable as a packing material for preventing permeation of asphalt or oils.

The non-sticking agent is a substance which prevents adhesion of adhesive materials to a substrate by decreasing the critical surface tension of the surface of said substrate. It comprises a releasing agent, a releasing sheet-processing agent, a backing agent, an anti-blocking agent, etc. The releasing agent is usually applied to a metal or wooden mold in a molding process for rubber, synthetic resin or the like by spraying or coating in order to assure good releasing. Sometimes, it is incorporated into a rubber or synthetic resin composition so as to impart thereto a self-releasing property. The backing agent is used, for instance, for backing a pressure sensitive adhesive tape to prevent its adhesion and facilitate its releasing. The releasing sheet processing agent is employed for production of a releasing sheet or paper to be used in a molding process of film, plate, etc. The anti-blocking agent is used as a treating agent for prevention of blocking between sheets, films, etc. retained in a closely contacted state for a long duration of time.

For practical use as the oil and water-repelling agent or the non-sticking agent, the copolymer of the invention may be dissolved in an organic solvent (e.g. acetone, methyl ethyl ketone, ethyl acetate, dimethylformamide, methyl chloroform, trichloroethylene, trichlorotrifluoroethane, tetrafluorodifluoroethane) to make a solution. Alternatively, the copolymer obtained by polymerization in a solvent may be diluted with such a solvent as mentioned above. The thus prepared solution or dilution may be incorporated with a jetting agent such as dichlorodifluoromethane, monofluorotrifluoroemethane or dimethyl ether and charged into an appropriate container to make an aerosol. Further, the copolymer of the invention may be dispersed into an aqueous solvent together with various additives in the presence of a suitable surfactant as an emulsifier to make an aqueous emulsion. As the surfactant, any of anionic, nonionic and cationic ones is utilizable without particular limitation. In some cases, the copolymer of the invention may be as such applied to a substrate by any suitable procedure.

For using the copolymer of the invention as the oil and water-repelling agent or the non-sticking agent, the composition of the constituting units of the copolymer is not particularly limited, and a variety of compositions may be adopted. When the copolymer contains both the unit (a) and another substituted oxyethylene group (d), the proportion of the unit (a) to the composition of the units (a) and (d) is required to be 5 mol % or more.

The oil and water-repelling agent containing the copolymer of the invention can be applied to various substrates without particular limitation. For example, textile fabrics and paper are treatable with particular advantage. There may be also exemplified porous materials such as wood, leather, fur, felt, asbestos and brick, and materials having a smooth surface such as metal, tile, plastics and various coated surfaces. Textile fabrics comprise the ones made from natural fibers of animal and plant origins (e.g. cotton, flax, wool, silk), synthetic fibers (e.g. polyamide, polyester, polyvinyl acetal, polyacrylonitrile, polyvinyl chloride, polypropylene), hemisynthetic fibers (e.g. rayon, acetate fiber), inorganic fibers (e.g. glass fiber, asbestos fiber) and their mixed fiber.

The non-sticking agent containing the copolymer of the invention as the active ingredient can be also applied to almost all of the substrates as mentioned above. The adhesive materials as the target of the non-sticking agent of the invention are natural or synthetic resins or rubbers such as polyurethane resin, epoxy resin, phenol resin, vinyl chloride resin, acryl resin, natural rubber, chloroprene rubber and fluorine-containing rubber. Industrially, the non-sticking agent is applicable, as a so-called "releasing agent", to a metal mold, a wooden mold, a plastic mold and a paper mold in molding of plastics and rubber, or utilizable for backing of adhesive tape made from paper, cellophane, cloth, plastic film or metal foil, or for preparation of a releasing paper.

The concentration of the copolymer in the oil and water-repelling agent is not particularly limited. In usual, a concentration of 0.01 to 30% by weight, preferably 0.1 to 2.0% by weight, may be adopted. With a solution having a too low concentration, the oil and water-repelling property is not given sufficiently. A too high concentration is disadvantageous from the economical viewpoint.

As to the concentration of the copolymer in the non-sticking agent, a low concentration of 0.01% or less is usually sufficient when used as a releasing agent for the purpose of effecting releasing only once. In the case that the life of the agent is necessitated for a long duration of time after its application, a concentration of 0.05 to 30% by weight, preferably 0.1 to 10% by weight, may be required. For the use as the backing agent or the anti-blocking agent, almost the same concentration as above may be adopted. When the copolymer is used by incorporating into a rubber or synthetic resin composition as an inner releasing agent, the concentration may be usually from 0.05 to 10% by weight, preferably from 0.1 to 3% by weight to the weight of the composition.

The procedure for application of the oil and water-repelling agent or the non-sticking agent containing the copolymer of the invention as the active ingredient to a substrate may be appropriately selected depending on their preparation forms, the kind of the substrate, the purpose of the use of the substrate, etc. When, for example, formulated in a solution or an aqueous emulsion, it may be applied to the surface of the substrate by a conventional procedure such as spraying, immersion or coating, followed by drying, and if necessary, curing. An aerosol may be jetted to the substrate and then dried.

The oil and water-repelling agent of the invention may contain, in case of necessity, various additives such as an anti-static agent, a fire-proofing agent and a sizing agent. Further, film forming resins such as acryl resins and vinyl acetate resins or fine powders of silicon oxide and polytetrafluoroethylene may be incorporated therein. The non-sticking agent of the invention may contain, in case of necessity, film forming resins such as acryl resin and vinyl acetate resin, paints such as lacquor and vinyl chloride paint, fine powders of silicon oxide and polytetrafluoroethylene, oils such as silicone oil and fluorine oil, etc.

The present invention will be hereinafter explained further in detail by the following Examples wherein parts and % are by weight unless otherwise indicated.

The oil and water-repelling property in these Examples is evaluated by the following criterion: the water-repelling property being indicated by the water-repellency number determined by the spray method according to AATCC (American Association of Textile Chemists and Colorists) 22-1952; the oil-repelling property being indicated by the oil-repellency number determined by dropping a mixture of n-heptane and nujol in a varied mixing proportion (see Table 1) onto a specimen and observing whether the drop is kept or not for 3 minutes or more.

Table 1

| Oil - repellency No. | Composition of mixture | |
|---|---|---|
| | n-Heptane (% by volume) | Nujol (% by volume) |
| 150 | 100 | 0 |
| 140 | 90 | 10 |
| 130 | 80 | 20 |
| 120 | 70 | 30 |
| 110 | 60 | 40 |
| 100 | 50 | 50 |
| 90 | 40 | 60 |
| 80 | 30 | 70 |
| 70 | 20 | 80 |
| 60 | 10 | 90 |
| 50 | 0 | 100 |
| 0 | 100 % nujol can not be kept. | |

The contact angle is determined by the aid of a microscope for determination of a contact angle, "Goniometer" manufactured by Elma Kogaku K.K.

The peeling test is carried out by the following procedure: an adhesive tape (specified in each Example) is sticked on the coated surface and pressed under a pressure of 5 kg/cm² at room temperature, and a load of 20 k/cm² is charged thereon at 20° C. and 70° C.; after 20 hours, the peeling strength at 180° is measured by the aid of a self-recording tensile tester.

EXAMPLE 1

In a glass ampoule,

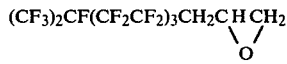

(hereinafter referred to as [I]) (3.50 g), succinic anhydride (0.67 g) and 2-methyl-2-oxazoline (0.56 g) (molar ratio, 1:1:1) are charged in nitrogen atmosphere, and N,N-dimethylformamide (3 ml) and toluene (2ml) are added thereto to make a homogeneous solution. After sealing, the ampoule is heated at 100° C. for 24 hours, whereby the reaction system turns black. The contents are poured into methanol to form black precipitates. A chloroform solution of the thus obtained precipitates is poured into methanol, and the reprecipitated product is collected to obtain a black brown grease-like substance (3.31 g) (yield, about 70%). The conversion of [I] is 75%, and that of 2-methyl-2-oxazoline is 100%.

In the infrared absorption spectrum of this substance, the following absorptions are observed: C=O in ester group (1740 cm$^{-1}$); C=O in acid amide group (1650 cm$^{-1}$); C—F (1150-1250 cm$^{-1}$ and 980 cm$^{-1}$). An absorption characteristic to acid anhydride is not observed.

From the results, the substance is proved to be a ternary copolymer having as the constituting units a group:

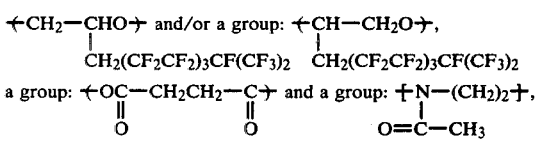

each being obtained by ring cleavage of the starting monomers.

The softening point of this copolymer is 35° C. The molar ratio of the constituting units presumed from the results of the elementary analysis is as follows:

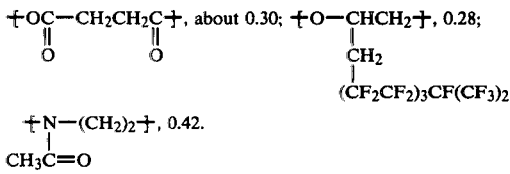

Elementary analysis: Found, C, 34.31%; H, 2.62%; N, 2.43%; F, 46.3%. Calcd., C, 34.86%; H, 2.43%; N, 2.19%; F, 47.1%.

EXAMPLE 2

In a 100 ml volume flask equpped with a reflux condenser and a stirring apparatus, a mixture of

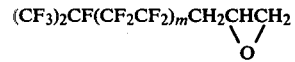

(hereinafter referred to as [II]) (composition: m=3, 55 mol %; m=4, 28 mol %; m=5, 11 mol %; m=6, 4 mol %; m=7, 1 mol %) (54.0 g), phthalic anhydride (17.2 g) and 2-methyl-2-oxazoline (8.8 g) are charged in nitrogen atmosphere, and the contents are heated under stirring. The reaction is carried out at 100° C. for about 1 hour, whereby the reaction system turns to a brown homogeneous solution. Then, stirring is continued at 120° C. for 10 hours. When the reaction system is cooled to some extent, the contents (somewhat viscous liquid) are taken out and allowed to stand still for cooling to room temperature to obtain a brown solid (78.2 g). In the infrared absorption spectrum of this product, the following absorptions are observed: C=O in ester group (1730 cm$^{-1}$); C=O in acid amide (1650 cm$^{-1}$); o-substituted phenyl group (1070 and 740 cm$^{-1}$); C—F (1150-1250 and 980 cm$^{-1}$).

From the above results, the product is proved to be a copolymer having the constituting units corresponding to and originated from the starting monomers. The softening point of the copolymer is 44° C.

EXAMPLE 3

Copolymerization of the said mixture [II] (35.6 g), phthalic anhydride (6.4 g), tetrachlorophthalic anhydride (5.1 g) and 2-methyl-2-oxazoline (1.47 g) is carried out in the same manner as in Example 2 to obtain a copolymer as a brown solid (47.3 g). The softening point of this copolymer is 54° C. The result of the infrared absorption spectrum analysis is as follows: C=O in ester group (1730 cm$^{-1}$); C=O in acid amide group (1650 cm$^{-1}$); C—F (1150-1250 and 980 cm$^{-1}$); o-substituted phenyl group (1070 and 740 cm$^{-1}$); C—Cl in phenyl group (720 cm$^{-1}$). From the results, the product is proved to be a copolymer having the constituting units corresponding to and originated from the starting monomers.

EXAMPLE 4

In a 100 ml volume flask equipped with a reflux condenser and a stirring apparatus, the said mixture [II] (39.2 g), phthalic anhydride (6.9 g) and 2-methyl-2-oxazoline (1.69 g) are charged in nitrogen atmosphre, and the contents are heated under stirring. After about 1 hour, the reaction mixture turns to a brown homogeneous solution. When stirring is continued at 120° C. for 1.5 hours, tetrachlorophthalic anhydride (5.7 g) is added, and the reaction is further continued. About 1.5 hours after the addition of the anhydride, the reaction mixture turns homogeneous again. The reaction is continued for further 3 hours. After completion of the reaction, the contents are taken out and allowed to stand to room temperature. The thus obtained brown solid (51.8 g) shows a softening point of 48° C. The result of the infrared absorption spectrum analysis is as follows: C=O in ester group (1730 cm$^{-1}$); o-substituted phenyl group (1070 and 740 cm$^{-1}$); C=O in acid amide group (1650 cm$^{-1}$); C—Cl in tetrachlorophenyl group (720 cm$^{-1}$); C—F (1150-1250 and 980 cm$^{-1}$).

Consequently, the product is proved to be a copolymer having the constituting units corresponding to and originated from the starting monomers.

EXAMPLES 5 TO 10

The polymerization is effected in the same manner as in Example 1 but changing the proportion of the monomers. In Examples 8 to 10, phthalic anhydride is used as the cyclic acid anhydride.

The results are shown in Table 2. The ratio of the constituting units in the produced copolymer is calculated from the values obtained by the elementary analysis.

Table 2

| Example No. | Cycle acid anhydride | Proportion of monomers (molar ratio) | | | Yield of produced Copolymer (%) | Conversion of [I] (%) | Proportion of constituting units in co-polymer (molar ratio)* | | |
|---|---|---|---|---|---|---|---|---|---|
| | | Epoxide [I] | Cyclic acid anhydride | 2-Methyl-2-oxazoline | | | (a) | (b) | (c) |
| 5 | Succinic anhydride | 1.0 | 0.46 | 0.56 | 30 | 28 | 1.0 | 1.22 | 1.48 |
| 6 | Succinic anhydride | 1.0 | 0.93 | 0.46 | 50 | 50 | 1.0 | 1.18 | 0.76 |
| 7 | Succinic anhydride | 1.0 | 2.0 | 0.48 | 63 | 73 | 1.0 | 1.68 | 0.55 |
| 8 | Phthalic anhydride | 1.0 | 1.0 | 1.0 | 45 | 65 | 1.0 | 2.63 | 2.63 |
| 9 | Phthalic anhydride | 1.0 | 1.0 | 0.62 | 48 | 42 | 1.0 | 1.03 | 0.61 |
| 10 | Phthalic anhydride | 1.0 | 2.1 | 0.67 | 68 | 95 | 1.0 | 1.18 | 0.45 |

Note:
*The units (a), (b) and (c) correspond respectively to those as originated from the epoxide [I], the cyclic acid anhydride and 2-methyl-2-oxazoline.

EXAMPLES 11 TO 19

The polymerization is effected in the same manner as in Example 1 (using a solvent) or in Example 2 (not using a solvent) but chainging the kinds of the monomers and the proportion of their amounts. The results are shown in Table 3 together with the kinds and the amounts of the starting monomers and the polymerization conditions.

In this Table, the epoxides [I] and [II] in the column of the monomer indicate respectively the fluorine-containing epoxide used in Examples 1 and 2. All of the produced copolymers are in the form of yellow or brown powders. As apparent from this Table, the yield of the produced copolymer is nearly 100% in all the cases excepting Example 11, which shows that the used monomers hardly remain unreacted.

Table 3

| Example No. | Monomer Kinds | Amount (g) | Molar ratio | Polymerization solvent | Reaction temperature (°C.) | Reaction time | Yield of copolymer (g) | Softening Point (°C.) |
|---|---|---|---|---|---|---|---|---|
| 11 | Epoxide [I] | 3.78 | 1.0 | Acetonitrile (3.5 ml) | 0 | 3 days | 2.20 | 36 |
| | Succinic anhydride | 0.72 | 1/0 | Toluuene (1 ml) | | | | |
| | 2-Methyl-2-oxazoline | 0.62 | 1.0 | | | | | |

Table 3-continued

| Example No. | Monomer) Kinds | Amount (8) | Molar ratio | Polymerization solvent | Reaction temperature (°C.) | Reaction time | Yield of copolymer (g) | Softening Point (°C.) |
|---|---|---|---|---|---|---|---|---|
| 12 | Epoxide [II] | 3.74 | 1.0 | N,N-Dimethylformamide (4 ml) | 110 | 1 day | 4.12 | 33 |
|  | Succininc anhydride | 0.65 | 1.0 |  |  |  |  |  |
|  | 2-methyl-2-Oxazoline | 0.23 | 0.4 | Toluene (1ml) |  |  |  |  |
| 13 | Epoxide [II] | 60.4 | 1.0 | Tc — | 150 | 5 hours | 70.1 | 73 |
|  | Phthalic anhydride | 6.81 | 0.45 |  |  |  |  |  |
|  | Pyromellitic acid anhydride | 5.01 | m 0.22 |  |  |  |  |  |
|  | 2-Methyl-2-oxazoline | 0.89 | 0.10 |  |  |  |  |  |
| 14 | Epoxide [II] | 79.4 | 1.0 | —.0 | 110 | 4 hours | 98.4 | 39 |
|  | Phthlic anhydride | 20.0 | 1.0 |  |  |  |  |  |
|  | 2-Methyl-2-oxazoline | 0.88 | 0.1 |  |  |  |  |  |
| 15 | Epoxide [II] | 16.8 | 0.7 | — | 120 | 5 hours | 24.2 | 42 |
|  | Epichlorohydrin | 1.1 | 0.3 |  |  |  |  |  |
|  | Phthalic anhydride | 6.1 | 1.0 |  |  |  |  |  |
|  | 2-Methyl-2-oxazoline | 0.94 | 0.3 |  |  |  |  |  |
| 16 | Epoxide [II] | 28.4 | 0.7 | — | 120 | 6 hours | 41.0 | 50 |
|  | Phenyglycidyl ether | 3.1 | 0.3 |  |  |  |  |  |
|  | Phthalic anhydride | 10.2 | 1.0 |  |  |  |  |  |
|  | 2-Methyl-2-oxazoline | 0.55 | 0.1 |  |  |  |  |  |
| 17 | Epoxide [II] | 10.4 | 0.1 | — | 120 | 6 hours | 63.5 | 65 |
|  | Phenylglycidyl ether | 24.1 | 0.9 |  |  |  |  |  |
|  | Phthalic anhydride | 26.7 | 1.0 |  |  |  |  |  |
|  | 2-Methyl-2-oxazoline | 2.9 | 0.2 |  |  |  |  |  |
| 18 | Epoxide [II] | 45.2 | 0.68 | — | 130 | 5 hours | 67.0 | 55 |
|  | Styrene oxide | 1.85 | 0.21 |  |  |  |  |  |
|  | 1,2-Buthlene oxide | 0.79 | 0.10 |  |  |  |  |  |
|  | 1,2-cyclohexane dicarboxylic anhydride | 17.4 | 1.0 |  |  |  |  |  |
|  | 2-Phenyl-2-oxazoline | 2.34 | 0.14 |  |  |  |  |  |
| 19 | Epoxide [I] | 30.0 | 0.92 | — | 100 | 10 hrs. | 43.0 | 35 |
|  | 2,3-Dimethyl-2,3-epoxybutane | 0.50 | 0.08 |  |  |  |  |  |
|  | Succinic anhydride | 4.0 | 0.64 |  |  |  |  |  |
|  | n-Hexadecylsuccinic anhydride | 8.1 | 0.40 |  |  |  |  |  |
|  | 2-Oxazoline | 1.78 | 0.40 |  |  |  |  |  |

EXAMPLE 20

The copolymer prepared in Example 1 (0.5 part) is dissolved in tetrachlorodifluoroethane (99.5 parts). Into the thus obtained solution, polyester Amundsen cloth is immersed, then nipped by a mangle 100% by weight wet pick up and dried at 100° C. for 3 minutes.

The water-repelling property of the thus treated cloth is 90 and the oil-repelling property is 110. In case of polyester Amundsen cloth not treated with the copolymer, both the water-repelling property and the oil-repelling property are 0.

EXAMPLE 21

The copolymer prepared in Example 2 (0.5 part) is dissolved in a mixture of methylchloroform (67 parts) and butyl acetate (2.5 parts). The thus obtained solution is charged into a can, and dichlorodifluoromethane (30 parts) is added thereto to make an aerosol of the copolymer.

The aerosol is sprayed onto polyester-cotton (65:35) mixed spun broadcloth to moisten the whole cloth lightly. After allowed to stand at room temperature for 30 minutes, the cloth is subjected to determination of the water-repelling property and the oil-repelling property, which are respectively 90 and 100. In case of polyester-cotton mixed spun cloth not treated with the aerosol, both the water-repelling property and the oil-repelling property are 0.

EXAMPLE 22

Each of the copolymers prepared in Examples 8 to 17 is dissolved in a solvent shown in Table 4 to make a solid concentration of 0.5%. Using the thus obtained solution, polyester Amunzen cloth is treated in the same manner as in Example 18, and the water-repelling property and the oil-repelling property of the treated cloth are measured. The results are shown in Table 4.

Table 4

| Polymer | Solvent (% in case of mixture) | Water-repelling property | Oil-repelling property |
|---|---|---|---|
| Ex. 8 | Methylchloroform (90) Ethyl (10) | 90 (19) | 100 |
| Ex. 9 | Methylchloroform (90) Ethyl (10) | 90 (19) | 100 |
| Ex. 10 | Methylchloroform (90) ethyl acetate (10) | 80 | 90 |
| Ex. 11 | Trichlorotrifluoroethane | 90 | 110 |
| Ex. 12 | Dimethylformamide | 90 |  |
| Ex. 13 |  |  |  |
| Ex.13 | Trichlorotrifluoroethane (80) Acetone (20) | 100 | 110 |
| Ex. 14 | Trichlorotrifluoroethane (50) Ethyl acetate (50) | 90 | 110 |

Table 4-continued

| Polymer | Solvent (% in case of mixture) | Water-repelling property | Oil-repelling property |
|---|---|---|---|
| Ex. 15 | Methylchloroform | 90 | 100 |
| Ex. 16 | Methylchloroform | 90 | 100 |
| Ex. 17 | Methylchloroform | 80 | 70 |

EXAMPLE 23

The copolymer prepared in Example 5 (10 parts) is dissolved in methyl isobutyl ketone (15 parts), and "Nonion HS-240" (nonionic surfactant manufactured by Nippon Oil and Fats Co., Ltd.) (0.2 part), "Nymean S-215" (nonionic surfactant manufactured by Nippon Oil and Fatts Co., Ltd.) (0.4 part) and water (74.4 parts) are added thereto. The mixture is stirred under high speed for 30 minutes by the aid of a homomixer to prepare a milky white aqueous emulsion, which remains in a stably emulsified state even after allowed to stand still at room temperature for 3 months.

The aqueous emulsion (3 parts) is diluted with water (97 parts), and nylon taffeta cloth is immersed therein. Then, the cloth is nipped by the aid of a mangle 40% by weight wet pick up, dried at 80° C. for 2 minutes and further treated at 150° C. for 2 minutes. The water-repelling property and the oil-repelling property of the thus treated cloth are 90 and 100, respectively. In case of nylon taffeta cloth not treated with the aqueous emulsion of the copolymer, the water-repelling property and the oil-repelling property are both 0.

EXAMPLE 24

A treating solution is prepared by admixing the aqueous emulsion of the copolymer obtained in Example 23 (5 parts), "Sumitex Resin NS-1" (glyoxal resin manufactured by Sumitomo Chemical Co., Ltd.) (10 parts), "Sumitex Accelerator X-80" (metal salt catalyst manufactured by Sumitomo Chemical Co., Ltd.) (3 parts) and water (82 parts).

Into the thus obtained treating solution, polyester cotton (50:50) mixed spun twill cloth is immersed and then nipped by the aid of a mangle 80% by weight wet pick up. After dried at 80° C. for 3 minutes, the cloth is further treated at 150° C. for 2 minutes. The water-repelling property of the thus treated cloth is 90, and the oil-repelling property is 100. In case of untreated polyester-cotton mixed spun cloth, the water-repelling property and the oil-repelling property are both 0.

EXAMPLE 25

To each of a glass plate, an aluminum plate and a polyester film, each having a cleaned surface, a 1% trichlorotrifluoroethane solution of the copolymer prepared in Example 2 is applied by the aid of a drawing brush. After allowing to stand for 1 hour, the contact angle of water and n-hexadecane is determined. For comparison, a glass plate, an aluminum plate and a polyester film not coated with the polymer solution are subjected to determination of the contact angle. The results are shown in Table 5, from which it is apparent that excellent water-repelling property and oil-repelling property are given to the surface of each substrate by the treatment with the copolymer.

Table 5

| Substrate | Contact angle of surface coated with polymer solution | | Contact angle of surface not coated with polymer solution | |
|---|---|---|---|---|
| | Water | n-Hexadecane | Water | n-Hexadecane |
| Glass plate | 112° | 72° | 10° | less than 10° |
| Aluminum plate | 112° | 71° | 15° | less than 10° |
| Polyester film | 113° | 72° | 38° | less than 10° |

EXAMPLE 26

The copolymer prepared in Example 12 (1 part) is dissolved in a mixture of trichlorotrifluoroethane (90 parts) and acetone (9 parts). The obtained solution is applied by the aid of a brush to a steel mold for molding of disc having a concave portion of 40 mm in diameter and 2 mm in depth and then dried in the air. For comparison, each of commercially available releasing agents A (silicone) and B (fatty wax) is diluted with toluene to make a 1% concentration and applied to another substrate by the aid of a brush. A mixture of "Epicoat No. 828" (thermosetting epoxy resin manufactured by Shell Oil Co., Ltd.) (100 parts) and triethylenetetramine (10 parts) is poured into the said mold, and a pin is sticked into the central portion in order to facilitate taking-out of the molded product after hardening. After allowed to stand at room temperature for 2 hours, the mixture is heated at 100° C. for 1 hour for hardening. Then, the pin is pulled to take out the molded product (disc) from the mold. The releasing property is estimated from the hand feeling at the taking-out according to the following criteria:

| Value | Taking-out condition |
|---|---|
| 5 | The molded product can be taken out from the mold even with little power. |
| 5 | It can be taken out with slight power. |
| 3 | It can be takenn out with somewhat strong power. |
| 2 | It can be taken out with difficulty even with strong power. |
| 1 | It can not be taken out even with strong power because it adheres to the mold. |

The releasing life is determined by applying the releasing agent once and then repeating the molding without further application, until the releasing is deteriorated. Namely, in case of the value being 3 or higher according to the above criteria, the molding is repeated without application, and the number obtained by substracting 1 from the number of times of the molding at which the value indicates 2 or lower is recorded as the releasing life. The releasing property is abruptly lowered at the point close to the releasing life. Until this point, an approximately equal releasing property is shown. The value of the releasing property shown in Table 6 is the one as seen most frequently in such determination.

Table 6

| Releasing agent | Releasing property | Releasing life (times) |
|---|---|---|
| Product of invention | 5 | 5 |
| Commercially available product A | 1 | 0 |
| Commercially available | 1 | 0 |

Table 6-continued

| Releasing agent | Releasing property | Releasing life (times) |
|---|---|---|
| product B | | |

EXAMPLE 27

The copolymer prepared in Example 12 (0.2 part) and "Epicoat No. 828" (epoxy resin manufactured by Shell Oil Co., Ltd.) (100 parts) are admixed well, and triethylenetetramine (10 parts) is added thereto. The resultant mixture is poured into the same mold as used in Example 26 which has been previously cleaned, any releasing agent being not applied thereto.

Using this mold, the resin is hardened as in Example 26, and the releasing property is estimated according to the same criteria. The molded product can be taken out from the mold with great ease, the value being 5. The molded product is transparent and shows the same appearance as that of the molded product obtained in Example 26 by molding the resin not incorporated with the copolymer in the mold coated with the copolymer solution. The contact angle of the molded product of this Example is 107° in case of water and 68° in case of n-hexadecane.

EXAMPLE 28

The copolymer prepared in Example 1 (0.7 part) is dissolved in a mixture of trichlorotrifluoroethane (40 parts) and acetone (9.3 parts). The resultant solution is charged into an aerosol can, and dichlorodifluoromethane (50 parts) is added thereto prepare an aerosol.

The aerosol is sprayed to a mold (for molding of four plates of 10 cm in length, 2 cm in width and 0.2 cm in thickness) of an automatic injection molding machine, and injection molding of polystyrene resin "HF-55" (manufactured by Mitsubishi Monsant Co., Ltd.) is carried out under the conditions: injection temperature, 190° C.; temperature of mold, 45° C.; retention time in mold, 25 seconds. The injection molding can be effected 20 times or more continuously. For comparison, the same procedure is repeated using a commercially available product C (aerosol of wax type releasing agent); but releasing becomes impossible when the molding is carried out 8 times continuously.

EXAMPLE 29

The copolymer prepared in Example 14 (2 parts) is dissolved in ethyl acetate (98 parts), and the resultant solution is applied to the surface of cellophane by the aid of a bar coater No. 8 and dried at 100° C. for 2 minutes. The non-sticking property of the cellophane thus coated is determined by the peeling test using a pressure sensitive adhesive tape (width, 18 mm; manufactured by Nichiban Company, Limited). For comparison, the non-sticking property of cellophane not coated with the copolymer is also determined by the same method. The results are shown in Table 7. It is apparent that the cellophane coated with the copolymer shows an excellent peeling property.

Table 7

| | 180°-Peeling strength after loading for 20 hours | |
|---|---|---|
| | Temperature (°C.) | (g/cm) |
| Cellophane coated with copolymer of Example 14 | 20 | 20 |
| | 70 | 23 |

Table 7-continued

| | 180°-Peeling strength after loading for 20 hours | |
|---|---|---|
| | Temperature (°C.) | (g/cm) |
| Cellophane not coated with copolymer of Example 14 | 20 | 120 |
| | 70 | 140 |

EXAMPLE 30

Each of the copolymers prepared in Examples 2 to 7 is dissolved in a solvent shown in Table 9 to make a solid concentration of 2%. The resultant solution is applied to a polyester film by the aid of a bar coater No. 8 and dried. The non-sticking property of the polyester film thus coated with the copolymer is determined by the peeling test by the use of a polyester tape having a width of 12 mm (manufactured by Nitto Denko Co., Ltd.). The results are shown in Table 8.

Table 8

| | | 180°-Peeling strength (g/cm) | |
|---|---|---|---|
| | Solvent (% in case of mixture) | After loading for 20 hours at 20° C. | After loading for 20 hours at 70° C. |
| Example 2 | Trichlorotrifluoroethane (50) Ethyl acetate (50) | 24 | 26 |
| Example 3 | Trichlorotrifluoroethane (50) Ethyl acetate (50) | 30 | 32 |
| Example 4 | Trichlorotrifluoroethane (50) Ethyl acetate (50) | 27 | 28 |
| Example 5 | Ethyl acetate | 28 | 30 |
| Example 6 | Ethyl acetate | 40 | 46 |
| Example 7 | Ethyl acetate | 32 | 36 |
| Untreated | — | 405 | 420 |

EXAMPLE 31

The copolymer prepared in Example 13 (2 parts) is dissolved in ethyl acetate (98 parts). On the surface of a kraft paper of 120 g/m² in weight, a 10% aqueous solution of polyvinyl alcohol (polymerization degree, 1750; saponification degree, 98.5) is applied by the aid of a bar coater No. 12 and dried. To the coated surface, the above obtained polymer solution is applied by the aid of a bar coater No. 8 and dried. To each of the thus treated kraft paper and an untreated kraft paper coated with polyvinyl alcohol alone, vinyl chloride plastisol ("ME-120" manufactured by Denkikagaku Kogyo K.K.) is applied to make a thickness of 300 microns and dried at 200° C. for 5 minutes for gelation. Then, the peeling resistance of the vinyl chloride film is determined by the aid of a self-recording tensile tester ("Tensilon" manufactured by Toyo Sokki K.K.). Further, the repeated usability is also tested.

It is confirmed from the results of these tests that the peeling resistance of the kraft paper coated with the copolymer is 12 g/cm and the same value is maintained even after repeated use in 10 times, while the peeling resistance of the kraft paper not coated with the copolymer is 22 g/cm and peeling of the film is impossible at the second use.

EXAMPLE 32

"Phthalkyd 240-60" (alkyd resin manufactured by Hitachi Chemical Co., Ltd.) (40 parts), "Melan 14" (melamine resin manufactured by Hitachi Chemical Co., Ltd.) (40 parts), n-butanol (3 parts) and a 10% butyl acetate solution of the copolymer prepared in Example 16 (9 parts) are admixed, and a 20% ethanol solution of hydrochloric acid (9 parts) is added thereto to prepare a coating paint. The paint is applied, as finish coating, to a plywood board by the aid of a bar coater No. 8 and dried.

For comparison, a coating paint is prepared from the same components as above but replacing the solution of the copolymer of Example 16 by butyl acetate (5 parts). This paint is applied to a plywood board in the same manner as above.

On the thus treated plywood board, a pressure sensitive adhesive tape having a width of 18 mm is sticked under pressure by a finger, and then the tape is peeled off vigorously. When the operation is repeated, the surface is peeled off at the first time of operation in case of the plywood board coated with the paint not containing the copolymer solution. To the contrary, any change is not seen in the surface state, even after repeated operations in 10 times, in case of the plywood board coated with the paint containing the copolymer solution.

What is claimed is:

1. A fluorine-containing copolymer comprising as the essential constituting units (a) a group of the formula:

$$\begin{array}{cc} Rf & Rf \\ | & | \\ (CH_2)_n & (CH_2)_n \\ | & | \\ -(O-CH-CH_2)- & \text{or} \quad -(O-CH_2-CH)- \end{array}$$

wherein Rf is a perfluoroalkyl group having 3 to 21 carbon atoms and n is an integer of 0 or 1, (b) a group of the formula:

$$-(O-\underset{\underset{O}{\|}}{C}-R-\underset{\underset{O}{\|}}{C})-$$

wherein R is one of the groups of the formula:

$$\begin{array}{cc} R_1 \ R_3 \\ | \ | \\ -C-C- \\ | \ | \\ R_2 \ R_4 \end{array}, \quad \begin{array}{c} R_5 \ R_6 \\ | \ | \\ -C=C- \end{array} \quad \text{and} \quad \underset{}{\underset{}{\bigcirc}}{\!-\!(X)_l}$$

wherein $R_1$ to $R_6$ is a hydrogen atom or a lower alkyl group, $R_1$ and $R_3$ being optionally combined together to form a cyclic ring, X is a halogen atom or a lower alkyl group and l is an integer of 0 to 4 and (c) a group of the formula:

$$-(N-(CH_2)_m)- \\ | \\ O=C-R'$$

wherein R' is a hydrogen atom, an alkyl group or an aryl group and m is an integer of 2 or 3.

2. The fluorine-containing copolymer according to claim 1, wherein the molar proportion of the groups (a), (b) and (b) is 1:1–3:1.

3. The fluorine-containing copolymer according to claim 2, wherein the molar proportion of the groups (a), (b) and (b) is almost 1:1:1.

4. The fluorine-containing copolymer according to claim 1, which further comprises (d) a substituted oxyethylene group of the formula:

$$-(O-CY_1Y_2-CY_3Y_4)-$$

wherein $Y_1$ to $Y_4$ are each a hydrogen atom, a phenyl group or a lower alkyl group optionally substituted with a halogen atom, a lower alkoxy group or a phenoxy group.

5. The fluorine-containing copolymer according to claim 4, wherein the amount of the group (d) is less than 95 mol % on the basis of the combination of the groups (a) and (c).

6. The fluorine-containing copolymer according to claim 5, wherein the molar proportion of the groups (a)+(d), (b) and (c) is 1:1–3:1.

7. The fluorine-containing copolymer according to claim 6, wherein the molar proportion of the groups (a)+(d), (b) and (c) is almost 1:1:1.

8. A process for preparing the fluorine-containing copolymer according to claim 1, which comprises subjecting a mixture comprising (a') an epoxide of the formula:

$$Rf(CH_2)_n\underset{\underset{O}{\diagdown \diagup}}{CHCH_2}$$

wherein Rf and n are each as defined in claim 1, (b') a cyclic acid anhydride of the formula:

$$\begin{array}{c} O \\ \| \\ C \\ R \diagup \quad \diagdown O \\ \diagdown \quad \diagup \\ C \\ \| \\ O \end{array}$$

wherein R is as defined in claim 1 and (c') a cyclic imino ether of the formula:

$$\begin{array}{c} N-(CH_2)_m \\ \| \quad | \\ R'-C-\!-\!O \end{array}$$

wherein R' and m are each as defined in claim 1 to polymerization.

9. The process according to claim 8, wherein the molar proportion of the monomers (a'), (b') and (c') is 1:1–3:1.

10. The process according to claim 9, wherein the molar proportion of the monomers (a'), (b') and (c') is almost 1:1:1.

11. A process for preparing the fluorine-containing copolymer according to claim 4, which comprises subjecting a mixture comprising (a') an epoxide of the formula:

$$Rf(CH_2)_n\underset{\underset{O}{\diagdown \diagup}}{CHCH_2}$$

wherein Rf and n are each as defined in claim 1, (b') a cyclic acid anhydride of the formula:

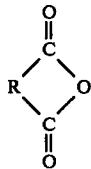

wherein R is as defined in claim 1, (c') a cyclic imino ether of the formula:

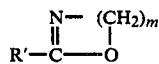

wherein R' and m are each as defined in claim 1 and (d') a substituted epoxide of the formula:

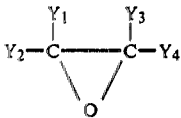

wherein $Y_1$ to $Y_4$ are each as defined in claim 4 to polymerization.

12. The process according to claim 11, wherein the amount of the monomer (d') is less than 95 mol % on the basis of the combination of the monomers (a') and (d').

13. The process according to claim 12, wherein the molar proportion of the monomers (a'), (b') and (c') is 1:1–3:1.

14. The process according to claim 13, wherein the molar proportion of the monomers (a')+(d'), (b') and (c') is almost 1:1:1.

15. A water and oil-repelling agent comprising as the essential component the fluorine-containing copolymer according to claim 1.

16. A water and oil-repelling agent comprising as the essential component the fluorine-containing copolymer according to claim 4.

17. A non-sticking agent comprising as the essential component the fluorine-containing copolymer according to claim 1.

18. A non-sticking agent comprising as the essential component the fluorine-containing copolymer according to claim 4.

* * * * *